United States Patent
Schaefer

[11] Patent Number: 5,636,731
[45] Date of Patent: Jun. 10, 1997

[54] SWITCH ASSEMBLY AND MOUNTING BRACKET THEREFOR

[75] Inventor: Roger E. Schaefer, St. Louis, Mo.

[73] Assignee: Emerson Electric Co., St. Louis, Mo.

[21] Appl. No.: 431,304

[22] Filed: Apr. 28, 1995

[51] Int. Cl.$^6$ .................................................. H01H 1/64
[52] U.S. Cl. ................... 200/293; 200/295; 310/68 A
[58] Field of Search ................................. 200/293, 295, 200/297, 333, 294, 47; 310/68 A, 68 R, 89, 71; 174/50.54, 50.51, 52.1, 52.3, 61, 62, 63, 656, 50, 48

[56] References Cited

U.S. PATENT DOCUMENTS

| | | | |
|---|---|---|---|
| 1,569,864 | 1/1926 | Leppert | 200/295 |
| 3,200,227 | 8/1965 | Karos | 200/296 |
| 3,412,225 | 11/1968 | Rogers et al. | 200/295 |
| 3,866,868 | 2/1975 | Fiss et al. | 200/296 |
| 4,295,018 | 10/1981 | Borrelli | 200/297 |

*Primary Examiner*—David J. Walczak
*Attorney, Agent, or Firm*—Polster, Lieder, Woodruff & Lucchesi

[57] ABSTRACT

A switch assembly (10) for installation on a dynamoelectric machine (M). An electrical overload switch (12) is interconnected with the dynamoelectric machine and electrical conduits (C) are routed thereto for resetting the dynamoelectric machine after it is shut down due to an overload condition. A conduit box (14) has opposed sidewalls (16, 18) and endwalls (20, 22), and an open top and bottom. A bracket (30) on which the switch is mounted is sized to fit in the box for a switch element (32) of the switch to be positioned adjacent an opening (34) in one wall of the box. Dimples (44a, 44b) are formed in the wall against which the bracket is installed. The dimples extend inwardly into the interior of the box and act as stops for the bracket for properly positioning the bracket and switch within the box. A plurality of knockouts (K1–K6) are formed in the sidewalls for providing an opening through which electrical conduits are routed to the switch when a knockout is removed. Mounting flanges (24, 26) are formed on opposite sides of the box for mounting the box to a cover (60) of the dynamoelectric machine. The cover has a top (62) sized to fit over the interior of the box. The top has a peripheral depending sidewall (64) covering an upper portion of respective sidewalls and endwalls of the box. Dimples (66a–66c) are formed in a section of the cover sidewall and extend inwardly. The box has corresponding dimples (70a–70c) formed therein into which the dimples in the cover sidewall fit for mounting the cover onto the box.

22 Claims, 3 Drawing Sheets

SWITCH ASSEMBLY AND MOUNTING BRACKET THEREFOR

BACKGROUND OF THE INVENTION

This invention relates to switch assemblies for use with large dynamoelectric machines including electric motors and generators having a control switch such as an overload reset switch mounted on the motor shell or endshield of the machine, and more particularly, to an improved, lower cost assembly.

It is not uncommon to mount larger dynamoelectric machines such as higher fractional horsepower or multi-horsepower motors or generators to a floor or other fixture at a using site. For this purpose, a bracket is attached to the motor with the bracket then being mounted to the floor or fixture. It is also not uncommon for the motor or generator to have an associated switch mounted to its outer shell or endshield. The switch is typically an overload protector type switch which interrupts power flow to the machine when an overload condition occurs. The switch is then either manually reset when the overload condition has been corrected; or, in some systems, the switch can be automatically reset. Electrical conduit for conveying power to the machine is routed from a central, power distribution network to a conduit box or enclosure in which the switch is also mounted. When electrically connected, the switch is interposed in the circuit path for powering the machine.

Previously, the switch was attached to a mounting bracket which was then riveted or welded to inside walls of the conduit box. This installation thus required a secondary manufacturing step which added cost to the machine assembly and its installation. Further, were the switch to fail, replacement of the switch required the replacement of the conduit box with the associated disconnection and reconnection of the conduits. This imposed an additional cost to the maintenance of the system in which the machine is used. Finally, there were a number of different sized conduit boxes which were used with different machines. By standardizing the size of a switch mounting bracket, it would be possible to reduce the number of boxes required and therefore reduce inventory costs.

SUMMARY OF THE INVENTION

Among the several objects of the present invention may be noted the provision of a switch assembly for an overload protection switch or the like used with a dynamoelectric machine such as an electric motor or generator; the provision of such an assembly comprising a conduit box mounted to a shell or endshield of the motor or generator; the provision of such a conduit box in which the overload switch is mounted in a bracket which is readily fitted in place within the conduit box and does not require welding or riveting for installation; the provision of such a conduit box having a cover which snap-fits in place to enclose the switch within the box and to facilitate access to the switch for service or replacement; the provision of such a bracket on which the overload switch is mounted, the bracket readily fitting within the conduit box and snap fitting in place to properly position the switch for electrical connection to the motor or generator; the provision of such a conduit box having inwardly projecting dimples at opposed ends of the box, the dimples acting as stops for the bracket when the bracket is inserted into the conduit box to properly position the bracket and locate a reset element of the switch at a desired opening in the box, and the bracket and switch being insertable into either end of the box; the provision of such a conduit box top also having inwardly extending dimples which are received in corresponding dimples or openings formed about the upper rim of the box to simplify installation of the top; the provision of such a conduit box and bracket which are readily and inexpensively formed with no secondary manufacturing operations involved thereby to lower the cost of the box; and, the provision of such a conduit box and bracket which are usable with a variety of motors and generators, with a minimum number of sizes being required thereby to minimize inventory costs.

In accordance with the invention, generally stated, a switch assembly is for installation on a dynamoelectric machine. An electrical overload switch is interconnected with the dynamoelectric machine and electrical conduits are routed thereto for resetting the dynamoelectric machine after it is shut down due to an overload condition. A conduit box has opposed sidewalls and endwalls, and an open top and bottom. A bracket on which the switch is mounted is sized to fit in the box for a switch element of the switch to be positioned adjacent an opening in one wall of the box. Dimples are formed in the wall against which the bracket is installed. The dimples extend inwardly into the interior of the box. The dimples act as stops for the bracket when it is fitted into the box to properly position the bracket and locate a reset element of the switch at the opening. A plurality of knockouts are formed in the sidewalls for providing an opening through which electrical conduits are routed to the switch when a knockout is removed. Mounting flanges are formed on opposite sides of the box for mounting the box to a cover of the dynamoelectric machine. A cover has a top sized to fit over the exterior of the box. The top has a peripheral depending sidewall covering an upper portion of respective sidewalls and endwalls of the box. Dimples are formed in a section of the cover sidewall and extend inwardly. The box has corresponding dimples formed therein into which the dimples in the cover sidewall fit, for mounting the cover onto the box. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
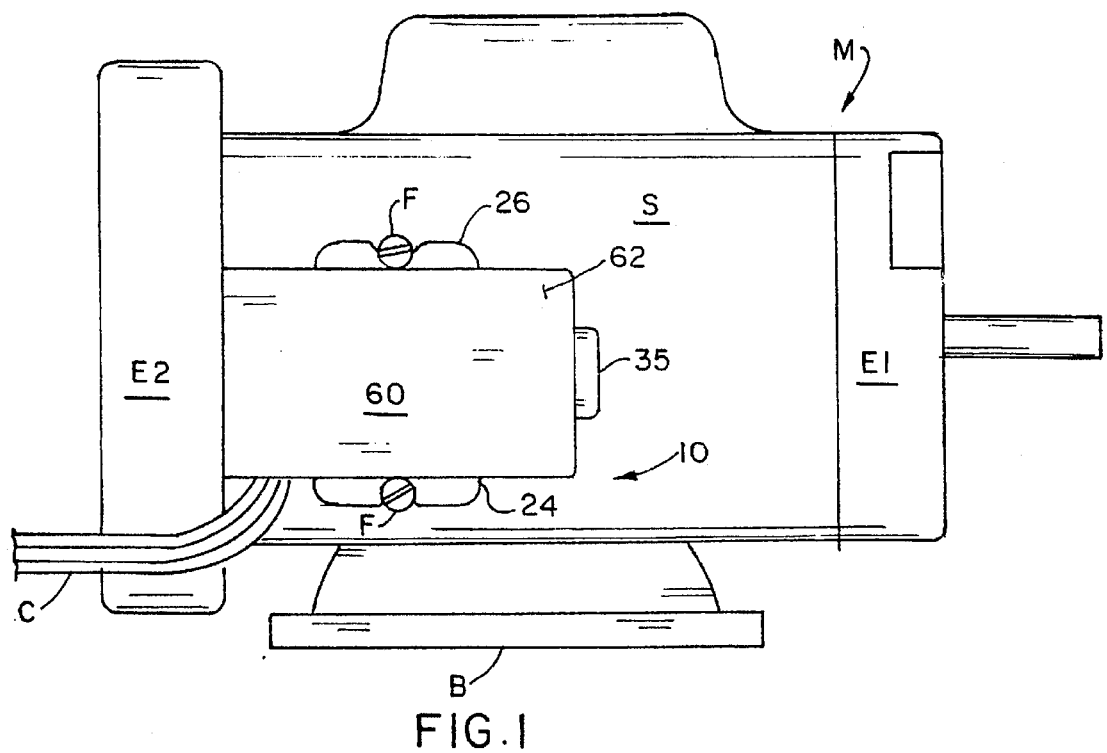
FIG. 1 is an elevational view of a dynamoelectric machine with a switch assembly of the present invention in place.

Referring to FIG. 1, a dynamoelectric machine such as an electric motor or generator is designated generally M. The machine has a shell S covering the central portion of the machine, and respective endshields E1, E2 enclosing the ends of the machine. The machine may be attached to a bracket B by which the motor or generator is mounted in an appropriate location. An electrical switch assembly of the present invention is indicated generally 10 and is interconnected with the dynamoelectric machine; and, in particular, with electrical conduits C by which power from a source (not shown) is routed to the machine. As shown in FIG. 1, the switch assembly is mounted on shell S of the machine; although, it will be understood that the assembly could also be mounted on one of the endshields as well. The switch assembly includes an overload reset switch 12 (see FIG. 3) for resetting the dynamoelectric machine after it is shut down due to an overload condition.

Figure 2:
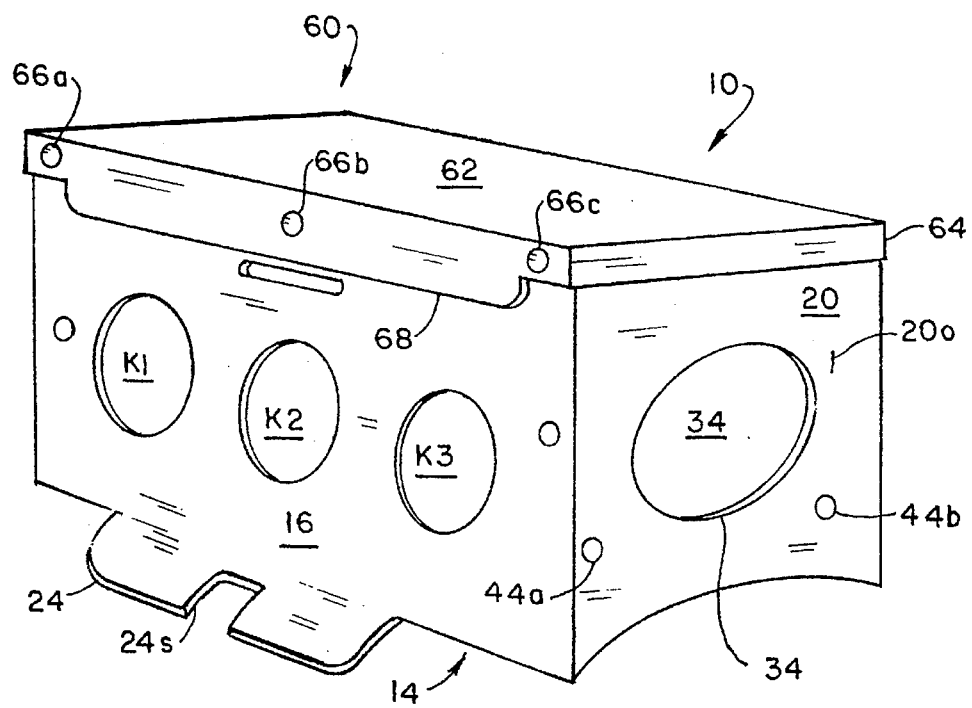
FIG. 2 is a perspective of the assembly with its cover installed.
Figure 7:
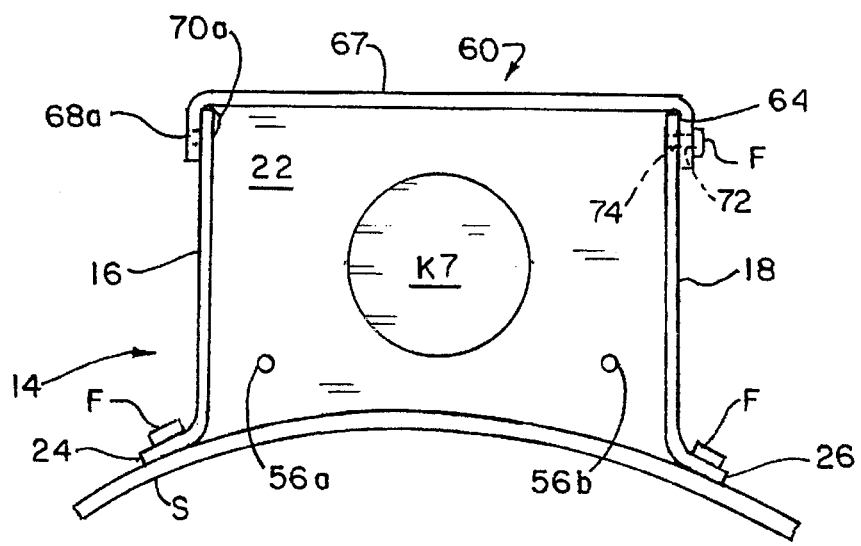
FIG. 7 is sectional view of the conduit box and its cover as installed on the dynamoelectric machine as taken along line 7—7 in FIG. 3; and, FIG. 8 is a plan view of the underside of the conduit box cover.

Assembly 10 includes a conduit box 14 which has opposed sidewalls 16, 18, and endwalls 20, 22. The top and bottom of the box are open. As shown in FIGS. 2 and 7, the base of the respective endwalls are curved to fit the curvature of the machine shell. In addition, respective mounting flanges 24, 26 are formed on opposite sides of the box for mounting the box to shell S. The flanges are similarly curved, as they extend outwardly from the outer sidewalls of the conduit box, to also fit the curvature of the machine shell. Each flange also includes an inwardly extending slot 24s, 26s for fasteners F such as screws or bolts by which the switch assembly is mounted in place.

Figure 3:
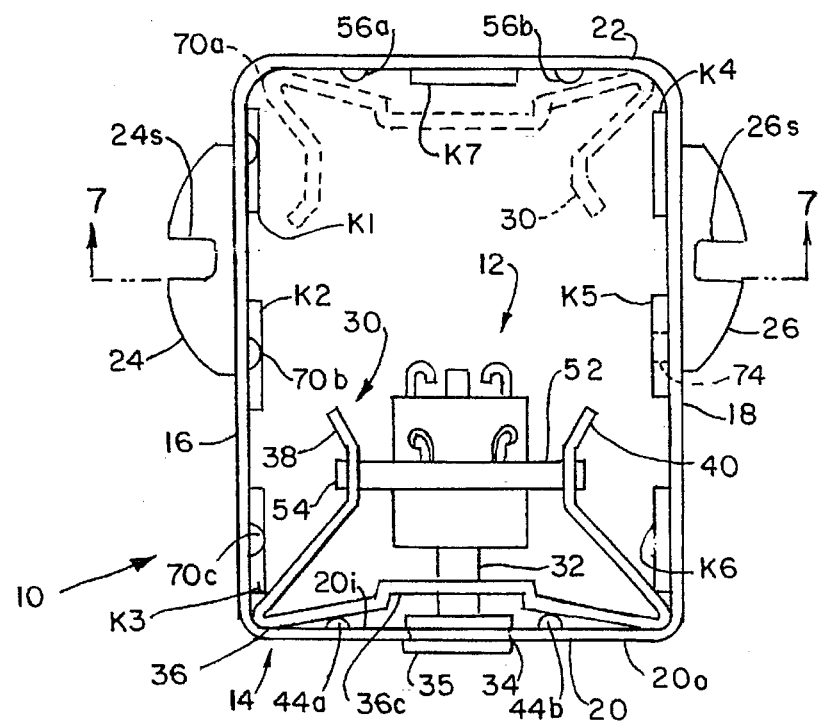
FIG. 3 is a top plan view of a conduit box of the assembly with its cover removed.
Figure 4:
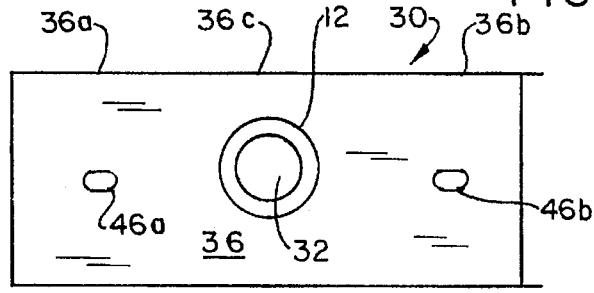
FIG. 4 is front elevational view of a switch mounting bracket installed in the conduit box.

Overload switch 12 is installed on a bracket 30 which is sized to fit in box 14. When so installed, a switch element 32 of the switch is positioned adjacent an opening 34 in endwall 20 of the box. A grommet 35 is installed in opening 34 and covers the outer end of the switch element. The grommet provides a water tight cover for the switch. And, the grommet is made of a flexible material by which the switch element is movable by pushing on the grommet to actuate switch 12. Bracket 30 includes a front section 36 and opposed side sections 38, 40. Front section 36 of the bracket has a width corresponding to that of endwall 20, on the inside of the endwall. Section 36 further has a recessed center portion 36c with a central opening 42 therein through which switch element 32 of the switch protrudes when the switch is mounted on the bracket. The section further has outer portions 36a, 36b flanking the center portion. The outer ends of these outer portions contact the inner face 20i of endwall 20. As shown in FIG. 2, a pair of dimples 44a, 44b are formed in outer face 20o of endwall 20. These are inwardly extending dimples as shown in FIG. 3. Sections 36a, 36b of bracket 30 have openings 46a, 46b respectively formed therein. If the bracket were to be installed in the conduit box using rivets, the rivets would be used with these openings. However, in accordance with the present invention, when the bracket is inserted in the conduit box, by insertion through the open top of the box, the dimples act as stops against which the bottom of front section 36 bear. This not only properly orients the bracket and switch in place, but retains the bracket and switch in the desired location without the bracket having to be welded or riveted to the box. This saves both manufacturing and installation costs.

Figure 5:
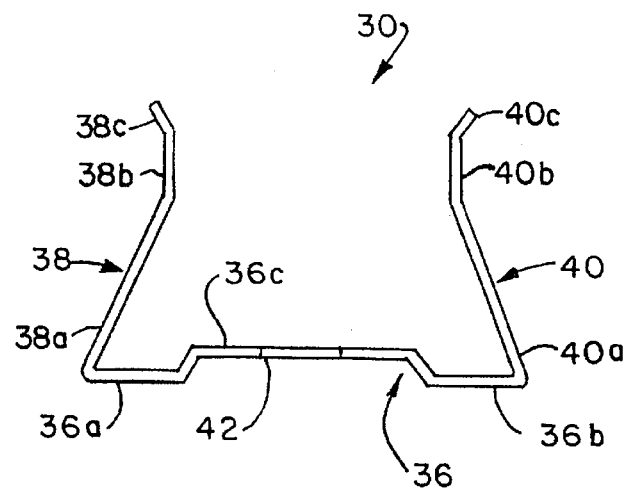
FIG. 5 is a top plan view of the bracket without the switch installed.
Figure 6:
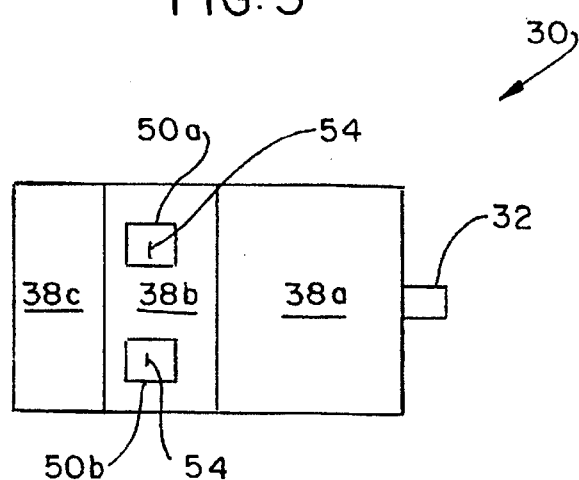
FIG. 6 is a side elevational view of the bracket.

As best shown in FIGS. 3 and 5, side sections 38, 40 of the bracket each extend inwardly from front section 36. Each side section has a first and inwardly extending portion 38a, 40a, an intermediate portion 38b, 40b, which extend perpendicular to front section 36 of the bracket, and an outwardly flaring rear portion 38c, 40c. Portions 38b, 40b, each have a pair of openings 50a, 50b. The openings are of the same size and are arranged vertically as shown in FIG. 6. Switch 12 has a circumferential collar 52 with a pair of tabs 54 on opposite sides of the switch body. The respective pairs of tabs are received in the respective sets of openings 50a, 50b to mount the switch to the bracket.

A plurality of knockouts K1-K6 are formed in the sidewalls of box 14 to provide an opening in the box through which electrical conduits C are routed to switch 12 when an appropriate knockout is removed. Knockouts K1-K3 are formed in sidewall 16, and knockouts K4-K6 in sidewall 18. Opening 34 in endwall 20 is also initially formed by a knockout. A corresponding knockout K7 is formed in opposite endwall 22. Dimples 56a, 56b corresponding to dimples 44a, 44b are formed in this endwall. This construction allows the bracket and switch to be located at either end of the conduit box depending upon the particular installation.

Figure 8:
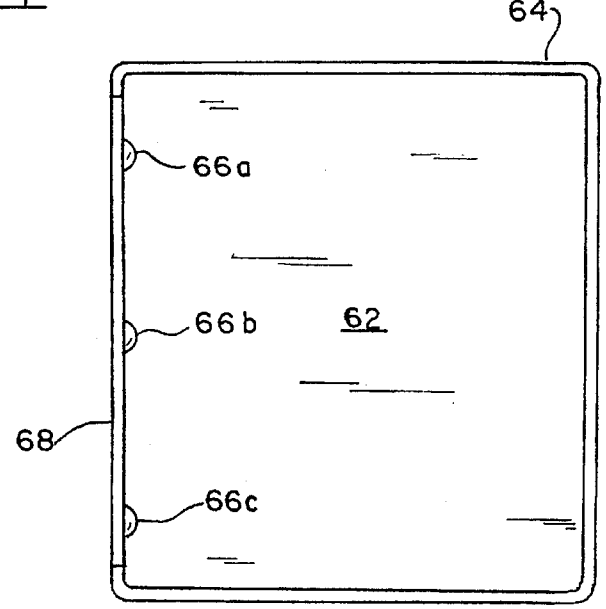

A cover 60 for the conduit box includes a top 62 sized to fit over the exterior of the box. The top has a peripheral depending sidewall 64 covering an upper portion of the respective sidewalls and endwalls of the box. Dimples 66a-66c are formed in a section 68 of the cover sidewall and extend inwardly as shown in FIG. 8. The box has corresponding dimples 70a-70c formed therein. The dimples in the cover sidewall fit into the dimples in the sidewall for mounting the cover onto the box. A hole 72 is formed in the portion of cover sidewall 64 opposite from the dimples. A corresponding opening 74 is formed in sidewall 18. Another fastener F is inserted through these openings, when the cover is in place, to fasten the cover to the box. Alternatively, dimples similar to dimples 66a-66c can be formed along this side of the cover, and dimples similar to dimples 70a-70c in sidewall 18, to help attach the cover to the box.

What has been described is a switch assembly for an overload protection switch or the like used with a dynamoelectric machine such as an electric motor or generator. The assembly includes a conduit box mounted to a shell or endshield of the motor or generator and is for installing an overload switch adjacent the motor or generator. This switch mounts on a bracket which is readily fitted in place within the conduit box. Welding or riveting are not required for installation. A cover for the box snap-fits in place to enclose the switch within the box. This facilitates access to the switch for service or replacement. A bracket on which the overload switch is mounted readily fits within the conduit box and snap fits in place to position the switch within the box for electrical connection to the motor or generator. The conduit box has inwardly projecting dimples formed at opposed ends of the box. The dimples act as stops for the bracket when it is inserted through the open top of the conduit box. This properly locates a reset element of the switch with respect to an opening in an endwall of the conduit box. The bracket and switch are insertable into either end of the box. The conduit box top also has dimples which fit into corresponding dimples or openings formed about the upper rim of the box. This simplifies installation of the top. The conduit box and bracket are readily and inexpensively formed without having to perform secondary manufacturing operations. This lowers the cost of the assembly. The conduit box and bracket are usable with a variety of motors and generators in a variety of installations.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A switch assembly for installation on a dynamoelectric machine for controlling operation of the machine comprising:

a housing comprising a rectangularly shaped conduit box;

an electrical switch for interconnection with the dynamoelectric machine and having electrical conduits adapted to be routed to the machine, and a switch element operable to operate the switch, said switch being an electrical overload switch for resetting the dynamoelectric machine after the machine has shut down due to an electrical overload condition;

a bracket sized to fit wholly inside the housing and to which the switch is mounted, the bracket having a front section extending substantially across a portion of the housing;

first attachment means formed on a sidewall of the housing for installing the bracket in the housing in a position in which the switch is properly oriented for connection with the electrical conduits, for only said switch element of said switch to protrude from an opening in said housing when said bracket is installed within said housing, said first attachment means allowing said bracket to be installed at one of two opposite ends of the conduit box;

cover means for enclosing the switch within the housing after the bracket and switch are installed therein; and, second attachment means including means cooperatively formed on the cover means and the housing for attaching the cover means to the housing, the second attachment means allowing the respective bracket and cover means to be respectively installed into and fitted over the housing for ease of installation and removal.

2. The switch assembly of claim 1 wherein the electrical switch is an overload switch for resetting the dynamoelectric machine has shut down due to an overload condition.

3. The switch assembly of claim 2 wherein said housing comprises a rectangularly shaped conduit box and said first attachment means allows the bracket to be installed at opposite ends of the conduit box.

4. The switch assembly of claim wherein said first attachment means includes dimples formed in an endwall of the conduit box and extending inwardly into the interior of the box, the dimples acting as stops for the bracket when the bracket is installed in the box, the dimples properly positioning the bracket and switch for electrically connecting the switch and the dynamoelectric machine.

5. The switch assembly of claim 4 wherein said first attachment means further includes dimples correspondingly formed in an opposite endwall of the conduit box for the bracket to be installed at either end box.

6. The switch assembly of claim 5 wherein said bracket includes a front section and opposed side sections, said front section having a width corresponding to that of an endwall of the conduit box and a recessed center portion with a central opening therein through which a switch element of the switch protrudes when the switch is mounted on the bracket.

7. The switch assembly of claim 6 wherein the side sections each extend inwardly from the front section of the bracket and have openings therein for attachment of the switch to the bracket, the switch having a collar with opposed tabs that are received in the openings of the side sections.

8. The switch assembly of claim 5 further including a knockout formed in each endwall of the conduit box, said knockout being removable to expose a switch element of the switch for actuating the switch.

9. The switch assembly of claim 8 further including a grommet installed in the opening left when the knockout is removed, the grommet providing a water fight cover for the switch, and the grommet being of a flexible material by which the switch element is movable by pushing on the grommet to actuate the switch.

10. The switch assembly of claim 9 further including a plurality of knockouts formed in opposed sidewalls of the conduit box for routing electrical conduit to the switch through an appropriate opening defined by one of the knockouts.

11. The switch assembly of claim 1 wherein the cover means includes a cover having a top sized to cover an opening in said housing through which said bracket and said electrical switch are installed in said housing a peripheral sidewall of said cover depending from the top of the cover and covering an upper portion of said housing adjacent said opening therein and said second attachment means including dimples formed in a section of the cover means sidewall and extending inwardly thereof, the housing having corresponding dimples formed therein into which the aforesaid cover means dimples fit for mounting the cover means onto the housing.

12. The switch assembly of claim 11 further including an opening formed in said cover means sidewall opposite of the dimples formed in the cover means sidewall, the housing having a corresponding opening formed therein for securing the cover means to the housing with a fastener inserted in said openings.

13. The switch assembly of claim 1 further including mounting means formed on opposed sidewalls of the box for mounting the box to a shell of the dynamoelectric machine.

14. A switch enclosure for installation on a dynamoelectric machine such as an electric motor or generator comprising:

an electrical overload switch for interconnection with the dynamoelectric machine and having electrical conduits adapted to be routed thereto for resetting the dynamoelectric machine after the machine is shut down due to an overload condition;

a box having opposed sidewalls and endwalls and an open top and bottom;

a bracket to which the switch is mounted, the bracket sized to fit in the box for a switch element of the switch to be positioned adjacent an opening in one wall of the box;

first attachment means including dimples formed in the wall of the box against which the bracket is adjacently installed, the dimples extending inwardly into the interior of the box and acting as stops for the bracket to properly position the bracket and switch for electrically connecting the switch with the dynamoelectric machine;

knockout means including a plurality of knockouts formed in the sidewalls of the box for providing an opening through which is electrical conduits are routed to the switch when one of the knockouts is removed;

mounting means formed on opposed sidewalls of the box for mounting the box to a cover of the dynamoelectric machine;

a cover including a top sized to fit over the exterior of the conduit box, the top having a peripheral sidewall depending therefrom and covering an upper portion of respective sidewalls and endwalls of the box; and, a second attachment means including dimples formed in a section of the cover sidewall and extending inwardly thereof with the box having corresponding dimples formed therein into which the dimples in the cover sidewall fit for positioning the cover onto the box.

15. The switch enclosure of claim 14 wherein the bracket has a front section and opposed side sections with the front section having a width corresponding to that of an endwall of the box and a recessed center portion with a central opening therein through which a switch element of the switch protrudes when the switch is mounted on the bracket and respective side portions which bear against the dimples extending inwardly into the box to stop the bracket as it is being installed.

16. The switch enclosure of claim 15 wherein the side sections each extend inwardly from the front section of the bracket and have openings therein for attachment of the switch to the bracket, the switch having a collar with opposed tabs that are received in the openings of the side sections.

17. The switch enclosure of claim 16 further including dimples correspondingly formed in an opposite endwall of the box for the bracket to be installed at either end of the box.

18. The switch enclosure of claim 17 further including a knockout formed in each endwall of the box and removable to expose the switch element of the switch for actuating the switch.

19. The switch enclosure of claim 18 further including a grommet installed in the opening left when the knockout is removed, the grommet providing a water tight cover for the switch, and the grommet being of a flexible material by which the switch element is movable by pushing on the grommet to actuate the switch.

20. The switch enclosure of claim 19 further including an opening formed in a sidewall of said box opposite of the dimples formed in the cover sidewall, the box having a corresponding opening in one of the cover sidewalls for securing the cover to the box with a threaded fastener.

21. A switch assembly for installation on a dynamoelectric machine for controlling operation of the machine comprising:

a housing;

an electrical switch for interconnection with the dynamoelectric machine and having electrical conduits adapted to be routed to the machine, the electrical switch being an overload switch for resetting the dynamoelectric machine after the machine has shut down due to an overload condition;

a bracket sized to fit in the housing and to which the switch is mounted;

first attachment means formed on a sidewall of the housing for installing the bracket in the housing in a position in which the switch is properly oriented for connection with the electrical conduits, said first attachment means allowing the bracket to be installed on opposite sides of the housing, and said first attachment means including dimples formed in a sidewall of the housing and extending inwardly into the interior of the housing, the dimples acting as stops for the bracket when the bracket is installed in the housing to properly position the bracket and switch for electrically connecting the switch and the dynamoelectric machine, and further including dimples correspondingly formed on the opposite side of the housing for the bracket to be installed on either side of the housing;

cover means for enclosing the switch within the housing after the bracket and switch are installed therein; and, second attachment means including means cooperatively formed on the cover means and the housing for attaching the cover means to the housing, the first and second attachment means allowing the respective bracket and cover means to be respectively installed into and fitted over an opening in the housing for ease of installation and removal.

22. A switch assembly for installation on a dynamoelectric machine for controlling operation of the machine comprising:

a housing comprising a rectangularly shaped conduit box;

an electrical switch adapted to be interconnected with the dynamoelectric machine and having electrical conduits adapted to be routed to the machine for applying electrical energy to the machine, and a switch element operable to operate the switch;

a bracket fitting within the housing and to which the switch mounts, the bracket having a front section extending substantially across a portion of the housing;

first attachment means formed on a sidewall of the housing for installing the bracket in the housing in a position in which the switch is properly oriented for connection with the electrical conduits, for only said switch element of said switch to protrude from an opening in said housing when said bracket is installed therewithin, said first attachment means also allowing said bracket to be installed at one of two opposite ends of the conduit box;

cover means for enclosing the switch within the housing after the bracket and switch are installed therein; and, second attachment means including means cooperatively formed on the cover means and the housing for attaching the cover means to the housing, the second attachment means allowing the respective bracket and cover means to be respectively installed into and fitted over the housing for ease of installation and removal.

* * * * *

UNITED STATES PATENT AND TRADEMARK OFFICE
CERTIFICATE OF CORRECTION

PATENT NO.   : 5,636,731
DATED        : June 10, 1997
INVENTOR(S)  : Roger E. Schaefer It is certified that error appears in the above-identified patent and that said Letters Patent is hereby corrected as shown below:

Column 3, line 33, delete "from", insert -- front --

IN THE CLAIMS:

Column 5, line 38, insert -- 1-- after "Claim".

Column 6, Line 1, delete "fight", insert -- tight --

Signed and Sealed this

Twenty-eighth Day of April, 1998

Attest:

BRUCE LEHMAN

*Attesting Officer*    *Commissioner of Patents and Trademarks*